(12) United States Patent
Kipp et al.

(10) Patent No.: US 10,508,437 B2
(45) Date of Patent: *Dec. 17, 2019

(54) UTILITY MATERIALS INCORPORATING A MICROPARTICLE MATRIX FORMED WITH A SETTING AGENT

(71) Applicant: Ashtech Industries, LLC, Provo, UT (US)

(72) Inventors: Michael D. Kipp, Highland, UT (US); Dilworth L. Pugh, Mapleton, UT (US); Michael D. Ridges, American Fork, UT (US); William T. McCarvill, Salt Lake City, UT (US)

(73) Assignee: Ashtech Industries, LLC, Provo, UT (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/659,431

(22) Filed: Jul. 25, 2017

(65) Prior Publication Data

US 2017/0321417 A1    Nov. 9, 2017

Related U.S. Application Data

(63) Continuation of application No. 14/087,575, filed on Nov. 22, 2013, now Pat. No. 9,816,266, which is a
(Continued)

(51) Int. Cl.
*E04B 1/90* (2006.01)
*C04B 28/26* (2006.01)
(Continued)

(52) U.S. Cl.
CPC ............... *E04B 1/90* (2013.01); *B32B 3/26* (2013.01); *B32B 3/30* (2013.01); *B32B 5/16* (2013.01); *C04B 14/02* (2013.01); *C04B 14/24* (2013.01); *C04B 18/081* (2013.01); *C04B 18/082* (2013.01); *C04B 20/0032* (2013.01); *C04B 22/06* (2013.01); *C04B 22/126* (2013.01); *C04B 24/2623* (2013.01); *C04B 24/282* (2013.01); *C04B 28/26* (2013.01); *C04B 38/085* (2013.01); *C08G 18/10* (2013.01); *C08G 18/3895* (2013.01); *C08L 75/04* (2013.01); *E04C 2/043* (2013.01); *E04C 2/2885* (2013.01); *B28B 19/0092* (2013.01); *C04B 2103/0046* (2013.01); *C04B 2111/0062* (2013.01);
(Continued)

(58) Field of Classification Search
CPC ......................................................... E04B 1/90
USPC .......................................................... 428/60
See application file for complete search history.

(56) References Cited

U.S. PATENT DOCUMENTS 5,256,222 A * 10/1993 Shepherd ............... B28B 3/123
                                                          106/631
9,816,266 B2 * 11/2017 Kipp ..................... C04B 22/126
2006/0051595 A1 * 3/2006 Gaudeus ................... B32B 7/12
                                                          428/423.1

FOREIGN PATENT DOCUMENTS

GB         2041384 A * 9/1980  ............. C04B 28/26

* cited by examiner

*Primary Examiner* — Brent T O'Hern
(74) *Attorney, Agent, or Firm* — Greenberg Traurig, LLP

(57) ABSTRACT

A composition, utility material, and method of making a utility material is disclosed. A composition having an improved setting time may include a plurality of microparticles mixed with a sodium silicate binder and an isocyanate setting agent, where the microparticle composition has a setting time of less than or equal to one hour. A utility material may be a wallboard that includes the composition.

18 Claims, 8 Drawing Sheets

Related U.S. Application Data continuation of application No. 12/612,675, filed on Nov. 4, 2009, now Pat. No. 8,591,677.

(60) Provisional application No. 61/198,554, filed on Nov. 4, 2008.

(51) Int. Cl.
| | |
|---|---|
| *C08G 18/10* | (2006.01) |
| *C08L 75/04* | (2006.01) |
| *E04C 2/04* | (2006.01) |
| *B32B 3/26* | (2006.01) |
| *B32B 3/30* | (2006.01) |
| *B32B 5/16* | (2006.01) |
| *E04C 2/288* | (2006.01) |
| *C04B 14/02* | (2006.01) |
| *C04B 14/24* | (2006.01) |
| *C04B 18/08* | (2006.01) |
| *C04B 20/00* | (2006.01) |
| *C04B 22/06* | (2006.01) |
| *C04B 22/12* | (2006.01) |
| *C04B 24/26* | (2006.01) |
| *C04B 24/28* | (2006.01) |
| *C04B 38/08* | (2006.01) |
| *C08G 18/38* | (2006.01) |
| *B28B 19/00* | (2006.01) |
| *C04B 103/00* | (2006.01) |
| *C04B 111/00* | (2006.01) |

(52) U.S. Cl.
CPC ............ *E04F 2201/0107* (2013.01); *E04F 2201/0138* (2013.01); *Y02W 30/92* (2015.05); *Y10T 428/24488* (2015.01); *Y10T 428/249971* (2015.04); *Y10T 428/249974* (2015.04); *Y10T 428/25* (2015.01)

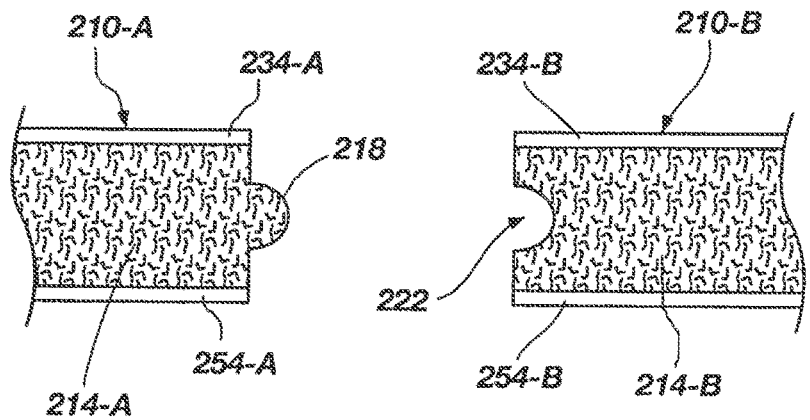
FIG. 5-A
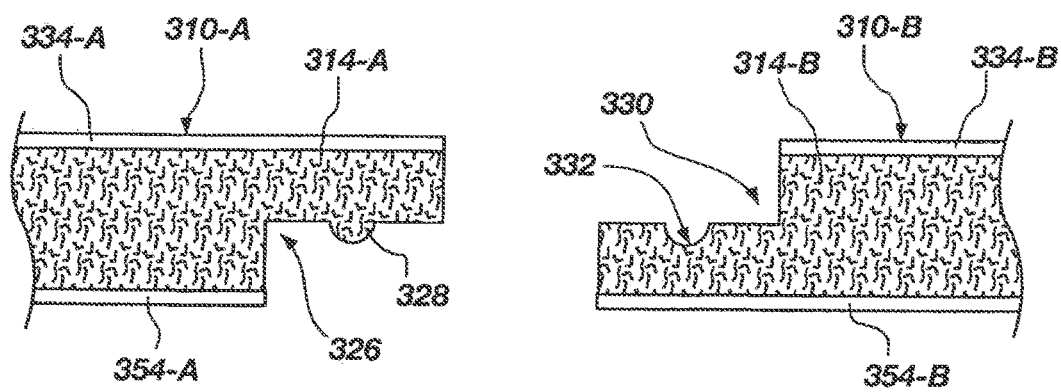
FIG. 5-B

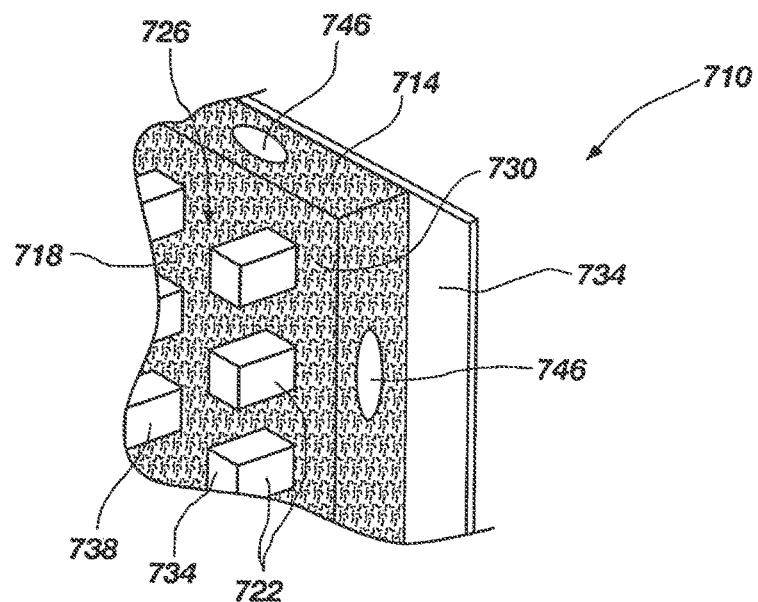
FIG. 6
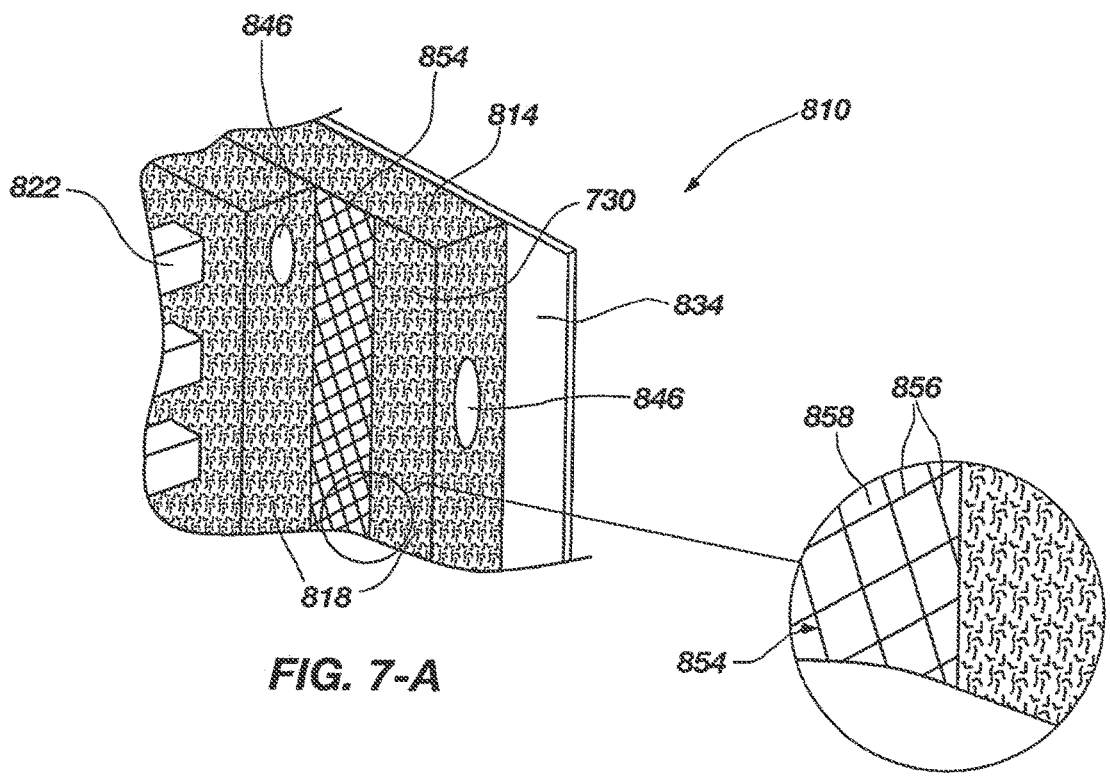
FIG. 7-A
FIG. 7-B

UTILITY MATERIALS INCORPORATING A MICROPARTICLE MATRIX FORMED WITH A SETTING AGENT

RELATED APPLICATION

This application is a continuation of U.S. patent application Ser. No. 14/087,575, filed Nov. 22, 2013, which is a continuation of U.S. patent application Ser. No. 12/612,675, filed Nov. 4, 2009, which claims the benefit of U.S. Provisional Patent Application No. 61/198,554, filed on Nov. 4, 2008, which are incorporated by reference herein in their entirety.

FIELD OF THE INVENTION

The present invention relates generally to various utility and/or building materials, such as wallboard, sound attenuation materials, shear panels, casting materials, etc., and more particularly to utility and/or building materials incorporating a microparticle-based core matrix. Accordingly, the present invention involves the fields of chemistry, manufacturing engineering, construction, and materials science.

BACKGROUND OF THE INVENTION AND RELATED ART

Many different types of building or utility materials, such as wallboard insulation, blown-in insulation, acoustical or sound dampening/absorbing materials, etc., exist in the art. These are all designed to provide a specific function within a structure. In addition, the composition of ingredients or components making up these utility materials varies greatly. Although there are many different available compositions making up the many different utility materials, relatively few of those incorporate microparticles, such as naturally occurring cenospheres or Extendospheres™, or synthetically manufactured microparticles, into their makeup.

In addition, many different types of naturally occurring and artificial microparticles exist. Cenospheres are naturally occurring microparticles found in "fly ash", which is formed during coal combustion. Cenospheres make up a small percentage (1%-4%) of fly ash. They are hollow particles with wall thicknesses about 10% of their diameter. Fly ash also includes small spherical solid particles that have a much higher bulk density than cenospheres.

In addition, there are several artificially manufactured microparticles used for a variety of purposes. Although such microparticles tend to be more consistent and uniform in their makeup and structure, they also tend to be extremely expensive and cost prohibitive for many applications.

Wallboard is a common utility or building material, which come in many different types, designs, and sizes. Wallboard can be configured to exhibit many different properties or characteristics, such as different sound absorption, heat transfer and/or fire resistance properties. By far, the most common type of wallboard is drywall or gypsum board. Drywall comprises an inner core of gypsum, the semihydrous form of calcium sulphate ($CaSO_4 \cdot \frac{1}{2} H_2O$), disposed between two facing membranes typically paper or fiberglass mats.

The most commonly used drywall is one-half-inch thick but can range from one quarter (6.35 mm) to one inch (25 mm) in thickness. For soundproofing or fire resistance, two layers of drywall are sometimes laid at right angles to one another. Drywall provides a thermal resistance, or R value, of 0.32 for three-eighths-inch board, 0.45 for half inch, 0.56 for five-eighths inch, 0.83 for one-inch board. In addition to increased R-value, thicker drywall has a slightly higher Sound Transmission Class (STC) rating.

Conventional interior walls in homes or buildings have opposing sheets of drywall mounted on a stud frame or stud wall. In this arrangement, with the drywall panels having a ½-inch thickness, the interior wall measures an STC of about 33. Adding fiberglass insulation helps, but only increases the STC to 36-39, depending upon the type and quality of insulation, as well as stud and screw spacing. As wallboard is typically comprised of several sheets or panels, the small cracks or gaps between panels, or any other cracks or gaps in the wall structure are referred to as "flanking paths," and will allow sound to transmit more freely, thus resulting in a lower overall STC rating.

SUMMARY OF THE INVENTION

Accordingly, the present invention provides a composition, utility material, and methods of making a utility material. In one aspect, for example, a composition having an improved setting time is provided. Such a composition may include a plurality of microparticles mixed with a sodium silicate binder and an isocyanate setting agent. In one aspect, the microparticle composition has a setting time of less than or equal to one hour.

In one aspect of the present invention, the plurality of microparticles is from about 25 wt % to about 75 wt % of wet composition, the sodium silicate is from about 20 wt % to about 60 wt % of wet composition, and the isocyanate setting agent is from about 2 wt % to about 10% of wet composition.

In another aspect of the present invention, the composition includes the sodium silicate binder and isocyanate setting agent at a ratio of from about 1:1 to about 15:1. In yet another aspect of the present invention, the composition includes the sodium silicate binder and the isocyanate setting agent at a ratio of from about 8:1 to about 12:1.

In still another aspect of the present invention, the plurality of microparticles has a size from about 10 microns to about 1000 microns. In a further aspect of the present invention, the plurality of microparticles has a size from about 10 microns to about 500 microns.

In some aspects of the present invention, the composition is a set composition. In a specific aspect, the composition is a cured composition.

In a further aspect of the present invention, the plurality of microparticles contain an inert gas within an internal space.

The present invention additionally provides a utility material. In one aspect, for example, a wallboard is provided. Such a wallboard may include a first facing membrane and a second facing membrane, and a core matrix disposed between the first facing membrane and the second facing membrane. The core matrix includes a composition as described above.

The present invention additionally provides a method of making a utility material. In one aspect, for example, a method of making a wallboard having a setting time of less than or equal to one hour is provided. Such a method may include forming a core matrix including a mixture of a plurality of microparticles, a sodium silicate binder, and an isocyanate setting agent, disposing the core matrix between a first facing membrane and a second facing membrane, and setting the core matrix.

In one aspect of the present invention, forming the core matrix further comprises forming a first mixture including a first portion of the plurality of microparticles and the sodium silicate binder, forming a second mixture including a second portion of the plurality of microparticles and the isocyanate setting agent, and mixing the first mixture with the second mixture to form the core matrix.

In another aspect of the present invention, the method further includes coating a contact surface of at least one of the first facing membrane and the second facing membrane with a sodium silicate coating prior to disposing the core matrix therebetween.

In yet another aspect of the present invention, the core matrix is from about 25 wt % to about 75 wt % of wet core matrix, wherein the sodium silicate is from about 20 wt % to about 60 wt % of wet core matrix, and wherein the isocyanate setting agent is from about 2 wt % to about 10 wt % of wet core matrix.

In still another aspect of the present invention, the core matrix includes the sodium silicate binder and the isocyanate setting agent at a ratio of from about 1:1 to about 15:1. In a further aspect of the present invention, the core matrix includes the sodium silicate binder and the isocyanate setting agent at a ratio of from about 8:1 to about 12:1.

In a further aspect of the present invention, the setting time is less than or equal to 30 minutes. In still a further aspect of the present invention, setting the core matrix occurs at ambient temperature.

In some aspects of the present invention, the method includes curing the core matrix. In a specific aspect, the method includes actively curing the core matrix by heating. In another specific aspect, the method includes passively curing the core matrix.

There has thus been outlined, rather broadly, various features of the invention to that the detailed description thereof that follows may be better understood, and so that the present contribution to the art may be better appreciated. Other features of the present invention will become clearer from the following detailed description of the invention, taken with the accompanying claims, or may be learned by the practice of the invention.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 5-A illustrates a detailed partial end view of a wallboard building material having a coupling system formed therein in accordance with one exemplary embodiment of the present invention;

FIG. 5-B illustrates a detailed partial end view of a wallboard building material having a coupling system formed therein in accordance with another exemplary embodiment of the present invention;

FIG. 6 illustrates a detailed perspective view of a wallboard building material in accordance with one exemplary embodiment of the present invention, wherein the building material comprises a microparticle-based core matrix, a multi-elevational surface configuration formed in one surface of the core matrix, and a facing sheet disposed on an opposing surface of the sore matrix;

FIG. 7-A illustrates a detailed perspective view of a wallboard building material in accordance with another exemplary embodiment of the present invention, wherein the building material comprises a microparticle-based core matrix, a lath disposed or sandwiched within the core matrix, a multi-elevational surface configuration formed in one surface of the core matrix, and facing sheet disposed on an opposing surface of the core matrix;

FIG. 7-B illustrates a detailed view of the building material of FIG. 7-A;

DETAILED DESCRIPTION OF EXEMPLARY EMBODIMENTS

Figure 1:
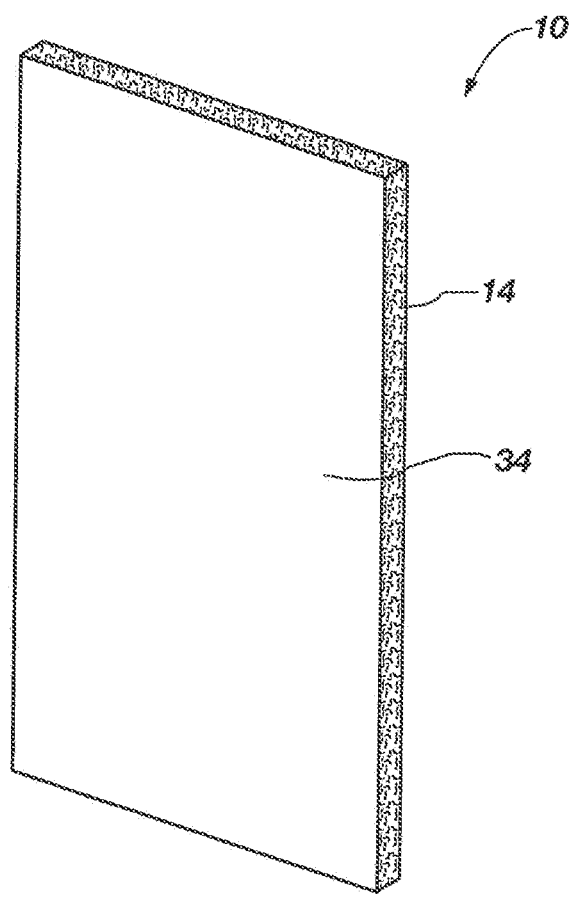
FIG. 1 illustrates a perspective view of a wallboard building material in accordance with one exemplary embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposed of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

U.S. patent application Ser. No. 12/077,951 filed on Mar. 21, 2008, is incorporated by reference herein in its entirety. U.S. patent application Ser. No. 12/238,399 filed on Sep. 25, 2008, is incorporated by reference herein in its entirety. U.S. patent application Ser. No. 12/238,367, filed on Sep. 25, 2008, is incorporated by reference herein in its entirety. U.S. patent application Ser. No. 12/238,379 filed on Sep. 25, 2008. is incorporated by reference herein in its entirety.

The following detailed description and exemplary embodiments of the invention will be best understood by reference to the accompanying drawings, wherein the elements and features of the invention are designated by numerals throughout.

In describing and claiming the present invention, the following terminology will be used in accordance with the definitions set forth below.

The singular forms "a," "an," "and," "the" include plural reference unless the context clearly dictated otherwise. Thus, for example, reference to "a wallboard" includes a reference to one or more of such wallboards, and reference to "the binder" includes reference to one or more of such binders.

As used herein, "substantially" refers to situations close to and including 100%. Substantially is used to indicate that, though 100% is desirable, a small deviation therefrom is not acceptable. For example, substantially free of mold includes situations completely devoid of mold, as well as situations wherein a negligible amount of mold is present, as determined by the particular situation.

As used herein, the term "about" is used to provide flexibility to a numerical range endpoint by providing that a given value may be "a little above" or "a little below" the endpoint.

For purposes of discussion and interpretation of the claims as set forth herein, the terms "utility material," "utility building material," or "building material," as used herein, shall be understood to mean various types of products or materials incorporating a matrix of microparticles (e.g., microspheres) adhered or bound together using one or more components, such as a binder of some kind and a setting agent. The building materials may comprise other additives, components, or constituents, such as setting agents, foaming agents or surfactants, water soluble polymers, and others. The building materials may comprise many different types, embodiments, etc., and may be used in many different applications.

The term "microparticle,"as used herein, shall be understood to mean any naturally occurring, manufactured, or synthetic particle having an outer surface and an interior space such as hollow interior. Generally, the microparticles referred to herein comprise a spherical or substantially spherical geometry having a hollow interior, known as micropeheres or cenospheres.

The term "core matrix, " as used herein, shall be understood to mean the combination of microparticles and other constituents used to form the support matrix of the building materials. The microparticles may be combined with one or more binders, setting agents, additives, etc. The terms "core matrix" and "composition" may be used interchangeably in the context of a utility material such as wallboard.

The term "ambient temperature" as used herein, shall be understood to mean the temperature of a surrounding environment when a composition or core matrix becomes set or cored. Unless indicated otherwise, ambient temperature ranges from about 65 degrees F. to about 80 degrees F.

The term "set composition," as used herein, is a composition that has become firm or hardened, due to a chemical change, sufficient to maintain a substantially self-supporting shape throughout a curing process. A set composition has at least some cross-linking between polymers. The terms "set core matrix" and "set composition" may be used interchangeably in the context of a utility material such as a wallboard. It shall be understood that a composition or core matrix can be set at ambient temperature, above ambient temperature, or below ambient temperature. Unless indicated otherwise, setting shall generally be understood to occur at ambient temperature.

The term "cured composition" is a composition that is substantially devoid of water. The terms "cured core matrix" and "cured composition" may be used interchangeably in the context of a utility material such as wallboard. A composition or core matrix may become cured at ambient temperature, above ambient temperature, or below ambient temperature. Upon curing, the water content of the wallboard material may be less than 5%, and can be less than 1%.

The term "multi-elevational" shall be understood to describe at least one surface of the core matrix of the building material, wherein the surface has formed therein a series of peaks and valleys (or protrusions and recesses) to provide an overall surface configuration having different surfaces located in different elevations and/or orientations. The multi-elevational surface configuration may be arbitrarily formed or patterned. In addition, the multi-elevational surface may be defined by any arbitrary or geometrically shaped protruding and recesses components.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibility to include not only the numerical values explicitly recruited as the limits of the range, but also to include all the individual numerical values or sub-ranges encompassed within the range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value. Furthermore, such an interpretation should only apply regardless of the breadth of the range or the characteristics being described.

The composition of the present invention provides several significant advantages over prior related compositions for utility materials (e.g., wallboard), some of which are recited here and throughout the following more detailed description. First, the present composition is capable of rapidly setting, typically in one hour or less. Second, the set composition of the present invention exhibits properties desirable for a utility material such as a wallboard. For example, the composition gives a wallboard properties that meet at least minimum industry standards such as strength, flexibility, hardness, nail pull resistance, as well as thermal and/or acoustical properties, fire resistant properties, etc.

Each of the above-recited advantages will be apparent in light of the detailed description set forth below, with reference to the accompanying drawings. These advantages are not meant to be limiting in any way. Indeed, one skilled in the art will appreciate the other advantages may be realized, other than those specifically recited herein, upon practicing the present invention.

The present invention describes a composition that may form part of a utility material, such as wallboard building material, casting material, etc. The composition may include microparticles, an inorganic binder, and a setting agent operable with the inorganic binder, which allows the composition to set under ambient temperature conditions and to possess a desired property once set or cured. It should be noted, however, that the present scope includes compositions that can be set at ambient temperatures, above ambient temperatures, and below ambient temperatures. The time needed to set the composition may depend upon the weight percentages of the various constituents of the core matrix, but may be less than or equal to one hour.

Once set, the composition may then be cured by allowing or causing the evaporation of water present within the composition. Curing may facilitate additional cross-linking of the binder(s) with the microparticles. In one aspect, curing may be done at ambient temperature, which may take between 12 and 48 hours, for example, for a wallboard material having a thickness of about ½ inch. In another aspect, curing may be accelerated by subjecting the composition to elevated temperatures, such as by heating, for a given period of time. Thus, curing by heating is temperature dependent and is different from curing at ambient temperature.

Further, the present invention described a method of manufacturing a utility material, such as a wallboard building material, shear panel, casting material, etc. As mentioned above, a composition, as described herein, may be a core matrix for a utility material. This, the method can include forming a core matrix including microparticles, an inorganic binder, and a setting agent operable with the inorganic binder to set the core matrix and to possess a desired property once set or cured. The core matrix can be deposited within a mold having any desired shape or configuration. The core matrix can then be allowed to set sufficient to form a set composition. Once set, the core matrix may then be cured.

The present invention also describes a method of making a wallboard or other utility material comprising the core matrix discussed herein, and having a setting time of less than or equal to one hour. In one aspect, a wallboard building material comprises a core matrix disposed between opposing facing sheets or layers, such as the type of paper common on conventional drywall-type wallboard products. In another aspect, a wallboard building material comprises a core matrix disposed on a single side of a single facing sheet, such that the wallboard has one side with an exposed core matrix face. In yet another aspect, a wallboard building material comprises one or more facing membranes disposed within the core matrix so the core matrix is on both sides of one or more interior facing membranes, such that both sides of the wallboard have exposed core matrix faces.

The microparticles contemplated for use herein may comprise many different types, sizes, shapes, constituents, etc. Although not limited to this, the microparticles used in the present invention wallboard building material will generally have a size ranging between 10 and 1500 microns, or between 10 and 1000 microns, and at times between 10 and 500 microns. Cenospheres sized between 10 and 500 microns are readily available. The bulk density of the microparticles is generally 0.4-0.6 g/ml, providing products that are much lighter than conventional wallboard building materials, such as gypsum-based drywall. The size of the microparticles will depend upon the application and the performance characteristics desired. However, the particles should not be so large as to cause any binder disposed thereon to run off or to not be effective. The size of the microparticles will also function to influence the permeability of the wallboard building material.

The microparticles are intended to be compatible with any binder, additives, and/or facing sheets. The shell thickness of the microparticles may be kept to a minimum amount, provided the microparticles maintain structural integrity as desired in the core matrix material. In one aspect, the microparticles can have a shell thickness of less than about 30% of the diameter of the microparticle. Wherein the microparticles are not spherical, the diameter of the particle can be calculated based on the effective diameter of the particle, using the total area of the cross section of the particle and equating such area to a circumferential area and determining the diameter from that value. In a further embodiment, the shell thickness can be less than about 20% of the diameter of the microparticle.

In one exemplary embodiment, the microparticles may comprise hollow, inert, lightweight, naturally occurring, glass particles that are substantially spherical in geometry. One particular type is sold under the trademark Extendospheres™, which are manufactured and sold by Sphere One Corporation. A hollow interior is preferred as this will reduce the weight of the building material, as well as provide good insulating properties. Furthermore, in one aspect, the microspheres or microparticles maintain structural integrity and retain their hollow nature, or original formation to the exclusion of binder or other matrix materials infiltrating the hollow portions of the microparticles.

In one aspect of this embodiment, the microparticles may comprise the naturally occurring hollow, inert, glass microspheres obtained from a fly ash byproduct, which microspheres are often referred to as cenospheres. These cenospheres may be separated from the other byproduct components present in the fly ash and further processed, such as to clean and separate these into desired size ranges. Cenospheres are comprises primarily of silica and alumina, and have a hollow interior that is filled with air and/or other gasses. They possess many desirable properties, such as a crush strength between 3000 psi and 5000 psi, low specific gravity and are able to endure extremely high temperatures (above 1800 degrees F.). Although they are substantially spherical in overall shape, many are not true spheres, as many are fragmented, or comprise unsmooth surfaces caused by additional silica and/or alumina.

The advantage with having a synthetic material is the uniformity and consistency between microparticles, thus making their behavior and the behavior of the resulting core matrix and building material more predictable. However, these advantages may not be significant enough to justify their use, as synthetic microparticles are extremely expensive to manufacture and can be cost prohibitive in many applications. The use of naturally occurring microparticles over synthetic ones to form a building material may depend on several different factors, such as the intended application, and/or the desired performance properties or characteristics. In some applications, naturally occurring microparticles may be preferred while in others a synthetic type may be more desirable. In one aspect, however, a combination of naturally occurring microparticles and synthetic microparticles can be utilized together in the core matrix. The combination of microparticles can be a homogeneous or heterogeneous distribution throughout the utility material.

Microparticles or microspheres can include an amount of air or other gases within the hollow interior. Where possible, the composition of the gaseous material within the microparticle can optionally be selected so as to provide enhanced characteristics of the utility material. For example, the hollow interior can include an inert gas or other known insulating gasses to improve the insulating properties of the overall utility material. In one embodiment, a noble gas such as argon may be used.

In one specific example, a composition or core matrix can include from about 25 wt % to about 75 wt % of microparticles based on wet information. In another specific example, a composition or core matrix can include from about 50 wt % to about 60 wt % of microparticles based on wet information.

The present invention further comprises one or more binders operable to couple together the microparticles and to facilitate formation of a core matrix. In one exemplary embodiment, the binder comprises an inorganic binder, such as sodium silicates in one form or another. This may or may not be combined with an organic binder such as polyvinyl acetate copolymer or ethylene vinyl acetate. A vinyl acetate copolymer may be used, for example, to increase water resistance of a wallboard.

In one specific example, a composition can include from about 20 wt % to about 60 wt % of sodium silicate binder based on wet information. In another specific example, a composition can include from about 35 wt % to about 45 wt % of sodium silicate binder based on wet formulation.

In many cases, the inorganic binder solution may comprise a ratio of sodium silicate to water of from about 1:2 to about 2:1, although, higher water content may necessitate a longer curing time. In one embodiment, the ratio of sodium silicate to water is 1:1. The sodium silicate may be pre-mixed and the solution provided in liquid form, or the sodium silicate may be in powder form and subsequently mixed with water.

The present invention further contemplates one or more constituents of the core matrix comprising a setting agent operable with the other one or more binders to cause or enable the core matrix composition to initially set or harden under ambient temperature conditions. In other words, it is contemplated that one or more setting agents may be present within the core matrix composition that will be result in a set or hardened core matrix, wherein at least a portion of the setting agent reacts to provide at least some cross linking that gives some structural integrity to the core matrix.

The present invention further comprises a setting agent operable to cause a composition or core matrix to set at a variety of temperatures, including ambient temperature. In one aspect, the setting agent can cause the composition to set in one hour or less. In one embodiment, a setting agent may be an isocyanate material. In a specific embodiment, the isocyanate material may be polymeric. In another aspect, the isocyanate material may be prepolymeric. A prepolymeric isocyanate is an isocyanate polymer chain having a reactive isocyanate terminal group. In one example, isocyanate molecular weight may be from about 1000 to about 8000. In another example, isocyanate molecular weight may be from about 2000 to about 5000.

Using a suitable setting agent such as isocyanate, the core matrix composition does not need to be subjected to elevated temperatures to effectuate initial setting or hardening, and may be cured to produce a suitable end product utility material that will possess the physical and performance properties desired for the particular type of utility material being manufactured.

In a specific example, isocyanate setting agent can be present in an amount from about 2% by weight to about 10% by weight of the total weight of the core matrix in wet mixture. In another specific example, isocyanate setting agent can be present in an amount from about 3% by weight to about 6% by weight of the total weight of the core matrix in wet mixture.

The ratio of binder to setting agent may range between 1:1 and 15:1, and typically between 8:1 and 12:1, depending upon the desired characteristics of the core matrix. Obviously, these ratios may be varied to vary the characteristic of the core matrix. For example, to increase the strength and other characteristics of a utility material, the core matrix may comprise a lower ratio of binder to setting agent (e.g., between 5:1 and 7:1).

The ratio of binder to microparticles may vary depending upon the building material to be formed. A higher ratio of binder to microparticles will result in a building material that is more solid and dense than one with a smaller ratio. Indeed, a smaller ratio of binder to microparticles will result in a more porous building material.

The core matrix may further comprise a setting agent in addition to isocyanate, configured or intended to enhance the water resistant properties of the building material, and particularly the core matrix of the building material. In one exemplary embodiment, the setting agent may comprise Class C fly ash. In another exemplary embodiment, the setting agent may comprise zinc oxide. In still another exemplary embodiment, the setting agent may comprise sodium fluorosilicate. Thus, Class C fly ash, zinc oxide, or sodium fluorosilicate may be used, for example, to increase water resistance of a wallboard.

The core matrix may further comprise one or more additives or fillers. Alternatively, the core matrix may be devoid of further additives and/or fillers. When present, these may be present in an amount between 0.01 and 50% by weights of the total weight of the core matrix in wet mixture. In one exemplary embodiment, the microparticles may be blended with expanded siliceous inorganic particles, such as perlite, to lower the density of the building material, decrease its weight, and reduce manufacturing costs. Specifically, it is contemplated that expanded siliceous inorganic particles may replace a portion of microparticles in an amount between 1% and 50% by weight of the total weight of the core matrix in wet mixture.

It should be noted that fly ash, of any type, can be utilized as a filler material, and/or optionally as a source of cenospheres. In one aspect, Class C fly ash can be one or the only source of microparticles. Class C fly ash can, in one aspect, be included in a core matrix in an amount ranging from about 0.5 wt % to about 50 wt %, in wet mixture form. In one aspect, it can be present in combination with synthetically made microparticles at a ratio of Class C fly ash to synthetic microparticles of about 1:15 to about 15:1. In a further embodiment, Class C fly ash can be present in an amount of less than about ⅓ of the amount of microparticles. The Class C fly ash used can optionally include greater than about 80 wt % calcium aluminum silicates, and less than 2 wt % time.

Without intending to be bound by any scientific theory, it is believed that upon mixing polymeric isocyanate with sodium silicate in water, a chemical reaction occurs that sets the composition and liberates $CO_2$. The chemical reaction can also case cross-linking to occur in the composition. It is believed that this cross-linking may be a result of the liberation of $CO_2$. Thus, in one aspect of the present invention, polymeric cross-linking can occur during setting.

By cross-linking the binder(s), a stronger more permanent physical coupling occurs among the binder, thus better physically securing the microspheres. As such, the present invention contemplates using one or more means to effectively cross-link the binders. In one exemplary embodiment, the binders may be cross-linked by setting the core matrix. In another exemplary embodiment, the binders may be cross-linked by curing the core matrix. It should be noted that this cross-linking during curing procedure is in addition to cross-linking that occurs during setting. In another exemplary embodiment, the binder may be cross-linked by elevating the temperatures of the binders to a suitable temperature for a suitable period of time to effectuate polymerization and binding. This may be done using conventional radiant heating methods, or it may be done using microwaves applied continuously or at various intervals, as well as with microwaves of different intensities. Depending on the binders used, it may be useful to add a limited amount of cross-linking agent to the binder formula in order to increase and/or control the cross-linking.

Cross-linking within a building material provides significant advantages over a building material having a composition that is not cross-linked. For example, with cross-linking, the binders are generally stronger, they do not absorb water as easily, and the connection between microparticles is much stronger. In addition, the building material does not weaken over time. Other advantages may be realized by those skilled in the art. Having said this though, there may be applications where cross-linking is not preferred, and where a non-bonded composition is better suited. This, of course, is contemplated herein.

Curing may facilitate additional polymerization, or cross-linking, beyond what occurred during setting. Curing of the core matrix may be active or passive. Active curing may be subjecting a composition or core matrix to elevated temperatures such as by heating. Passive curing may involve allowing a composition or core matrix to cure for a period of time without significant heating. Acceptable temperatures for curing may depend upon the material of the facing membranes. For example, an upper temperature may be limited by the facing membrane material to prevent damage to the material. In one embodiment, a facing membrane material may comprise paper. In this embodiment, a possible temperature for curing may range from between ambient temperature to about 400 degrees F. A useful temperature for curing, in this embodiment, may range from about ambient temperature to about 300 degreed F. A lower heating temperature, for example, may be about 125 degreed F. with a typical range being from about 150 degrees F. to about 300 degrees F.

As noted, a variety of methods can be useful in forming utility materials as presently contemplated. In one aspect, a method of forming a wallboard utility material can include first placing a precut facing sheet, such as wallboard paper white, face down in an appropriate mold. A formable composition can be formed by mixing microparticles, binder, and the setting agent. The formable composition can be spread over the paper in the mold and can be smoothed using any method. A second facing sheet, such as brown wallboard paper, can be placed over the mixture. A flat mold lid can be placed on top of the paper and fastened in place. At this point, the core matrix composition may be allowed to initially set via the setting agent. To effectuate curing, the resulting wallboard product can optionally be subjected to elevated temperatures for a given period of time, such as by heating, or it may be allowed to cure under ambient temperature conditions, although this may take longer. Heat curing can occur at temperatures greater than ambient temperature, preferably less than temperatures required to cause damage or degradation of the paper, mold, or components of the formable composition.

In one aspect, all components for the core matrix can be mixed together in a single step or in multiple separate steps in separate mixers. A variety of mixers can be utilized. In a specific embodiment, an auger can be utilized to mix the components for the core matrix. The mixture can be poured into a mold lined with a facing membrane, i.e., paper or aluminum, etc. The mold can be placed on a vibrating table so as to encourage proper spread of the mixture onto the membrane. Various other methods are known in the art to properly spread the mixture onto the membrane and are likewise contemplated herein. The second facing membrane can be placed on top of the leveled mixture and the mold can optionally be removed from the green or uncured wallboard. The green wallboard can then be positioned to effectuate initial setting or hardening of the core matrix. Once set, the green wallboard can then be further cured (e.g., such as being placed in an oven). This process can occur in batch, semi-batch, or continuous design.

In a continuous flow, a conveyor can move the green wallboard to and through an oven. Optionally, leveling rollers can be utilized to maintain the desired planar shape and thickness of the wallboard during drying. In one aspect, the presence of a metallic facing membrane can allow the method to include exposing the wallboard material to a temperature sufficient to effectuate even more rapid drying and curing of the core matrix. The parameters recited about can be appropriately modified for equipment, variations, in core matrix composition, facing membrane types, etc. In the case of batch formation, individual wallboard can be formed and placed in a multi-rack drying oven. Temperature profiles for the oven rack can range depending on the composition of the core matrix and the facing sheets used.

As noted, a method forming a wallboard material can include forming a core matrix including mixture of microparticles, sodium silicate binder, and an isocyanate setting agent. This may be followed by disposing the core matrix mixture between a first facing membrane and a second facing membrane and then setting the core matrix. In one aspect of the present invention, forming the core matrix may comprise forming a first mixture including microparticles and sodium silicate binder and forming a second mixture including microparticles and the isocyanate setting agent. This may be followed by mixing the first mixture with the second mixture to form the core matrix. In another aspect, the method may further include coating a contact surface of at least one of the facing membranes with a sodium silicate coating prior to disposing the core matrix between them. In another aspect, a wallboard building material comprises a core matrix disposed on a single side of a single facing sheet, such that the wallboard has one side with an exposed core matrix face. In yet another aspect, a wallboard building material comprises one or more facing membranes disposed within the core matrix so that the core matrix is on both sides of one or more interior facing membranes, such that the wallboard has two sides with exposed core matrix faces.

Once a core matrix is disposed on a facing membrane or between facing membranes, the core matrix can then be permitted to set or harden under normal ambient temperatures sufficient to form a wallboard material having the metallic facing membrane and the second facing membrane attached, adhered, bonded, or otherwise secured to the formed core matrix. The setting or hardening time may be completed in one hour or less, 30 minutes or less, or in 15 minutes or less, with curing (either under ambient temperature conditions or elevated temperature conditions if accelerated drying is desired) taking place thereafter to facilitate evaporation of water present within the core matrix and cross-linking of the binder(s) with the microparticles.

In one aspect, the method can be free form additional steps in-between the mixing, deposition, and setting steps; meaning the components may be mixed, including water, immediately deposited between facing membranes, and immediately caused to set or harden. In one aspect, the wallboard can be cute before and/or after setting and curing. In a further aspect, one or more leveling rollers can be utilized prior to or during the setting and/or curing steps to maintain a desired shape and level to the wallboard.

In a semi-rigid, molded state, the microparticles, setting agent, binder, and any other components are pre-mixed together in such a way so as to form a semi-rigid utility material. The microparticles are caused to dry or harden, as well as to bond via the binder. In one aspect, the pre-mixed composition may then be placed into a mold and formed into a desired size and shape in accordance with one or more molding methods, examples of which are described below.

In another aspect, the pre-mixed composition may be deposited or disposed onto a surface, such as a moving conveyor, and then cut or otherwise formed into the desired size and shape, either before or after the setting and/or curing steps.

The utility materials formed to comprise a semi-rigid makeup may be formed into panels of different size, shape, and thickness, such as panels that function as and that have physical characteristics comparable to conventional wallboard. Various backing or containing members may be utilized to support or provide a barrier to the composition. The density of the wallboard building material having the core composition just described can be between 0.4 g/ml and 0.6 g/ml.

Figure 2:
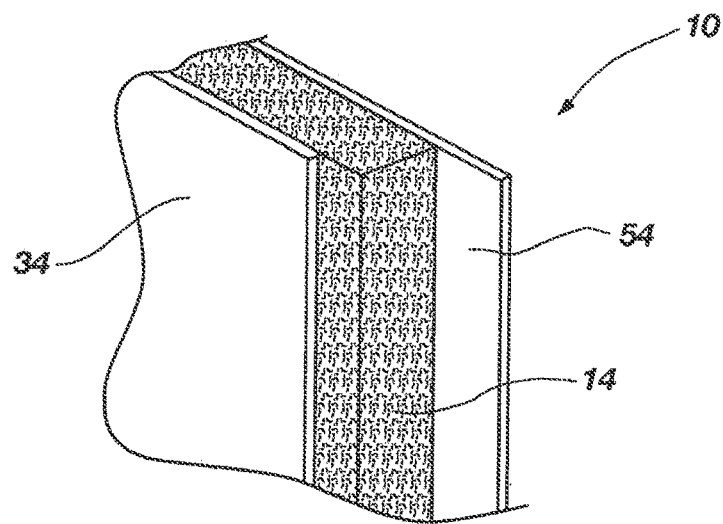
FIG. 2 illustrates a detailed partial perspective view of the wallboard building material of FIG. 1.

With reference to FIGS. 1 and 2, illustrated is a general perspective view and a detailed perspective view, respectively, of a wallboard building material in accordance with one exemplary embodiment of the present invention. As shown, the wallboard building material 10 is in panel form having a size of approximately 4 ft. in width, and 8 ft. in length, and approximately ½ inch thick, which is the same size as most conventional wallboard products. Of course, other sizes such as 4 ft. by 12 ft. sizes, as well as different thicknesses is also contemplated. The wallboard building material 10 is shown as comprising a core matrix 14 disposed between opposing facing sheets or layers, namely first facing membrane 34 and second facing member 54. Of course, the wallboard building material may comprise a single facing membrane, having one side exposed as discussed above. Each of the first facing membrane 34 and the second facing membrane 54 may have a contact surface in contact with the core matrix 14. A contact surface may be any portion of a surface, or an entire surface, of a facing membrane. Before a core matrix 14 is disposed between opposing facing membranes (or on at least one facing membrane), a contact surface of a facing membrane may be designated as a surface that will come into contact with the core matrix, including an individual component or sub-mixture of select core matrix components, during the process of making a wallboard. For example, a contact surface of a facing membrane may be coated with a sodium silicate coating prior to disposing the core matrix between facing membranes. In another example, a contact surface of a facing membrane may be coated with a sub-mixture of microparticles and sodium silicate binder or coated with a sub-mixture of microparticles and isocyanate setting agent, during the process of making a wallboard.

The core matrix 14 is comprised primarily of a plurality of microparticles, at least one binder and a setting agent (isocyanate setting agent) operable with the at least one binder, wherein the microparticles are at least bound or adhered together, and preferably bonded together, by the one or more binders and the setting agent to create a core matrix structure having a plurality of voids defined therein. The voids are formed from the point to point contact between the microparticles.

Figure 3:
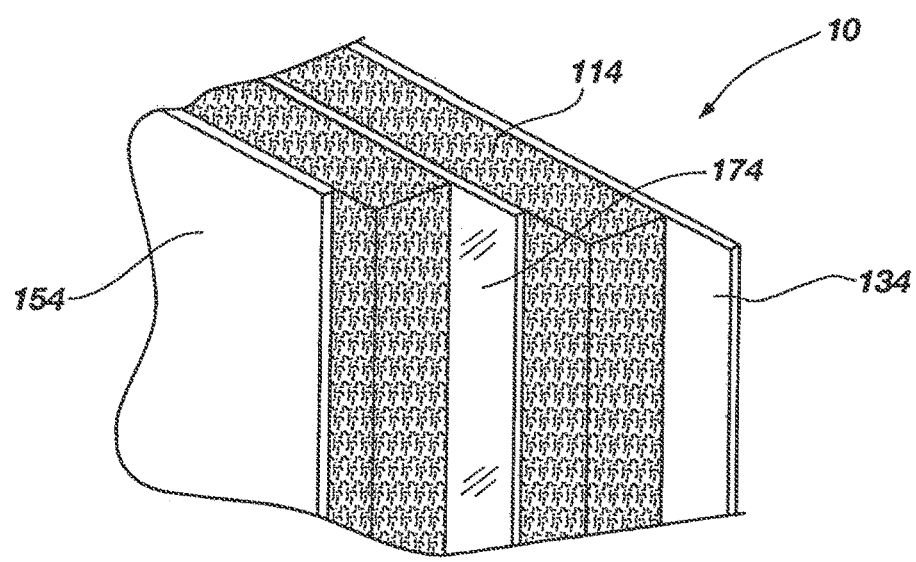
FIG. 3 illustrates a detailed partial perspective view of a wallboard building material in accordance with another exemplary embodiment of the present invention.

With reference to FIG. 3, the wallboard building material may further comprise a reinforcing member operable with the core matrix configured to provide enhanced characteristics on one or more areas as compared with the exemplary wallboard building material of FIGS. 1 and 2. In the exemplary embodiment shown, the wallboard 110 comprises similar components as discussed above with respect to the wallboard 10 of FIGS. 1 and 2, only the wallboard 110 comprises an additional reinforcing member 174 disposed within the core matrix 114 (sandwiched therein). Reinforcing member 174 is configured to reinforce or enhance one or more particles or characteristics of the wallboard 110. For example, the reinforcing member 174 may be configured to reinforce against (or improve the resistance of) sound transmission, heat transfer, or a combination of these. The reinforcing member 174 may also be configured to enhance the overall strength of the wallboard building material 110.

The reinforcing member 174 may comprise various types of materials, such as metals, woven or nonwoven fibers or fiber sheets, plastic films, etc. and may comprise any necessary thickness. In the exemplary embodiment shown, the reinforcing member 174 comprises an aluminum material disposed within the core matrix.

Figure 4:
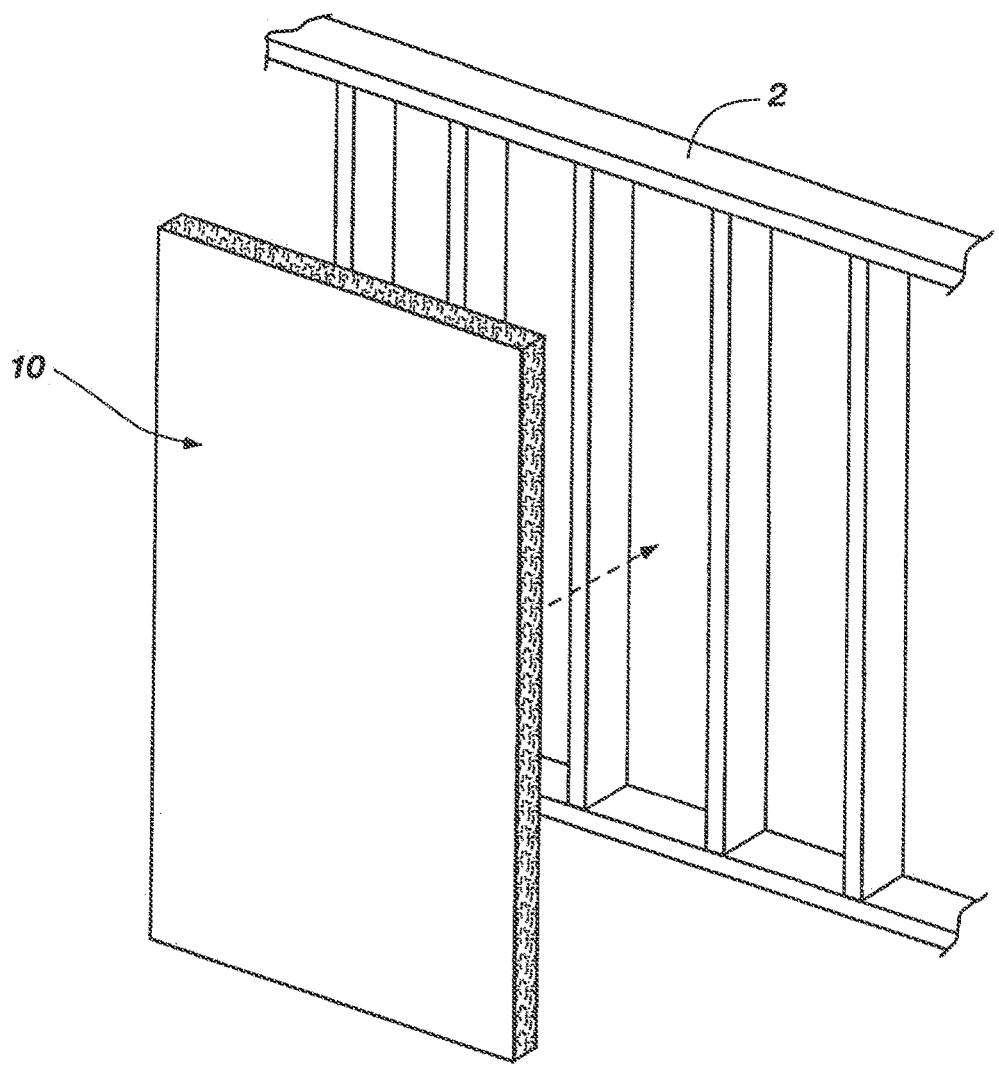
FIG. 4 illustrates a perspective view of a wallboard building material just prior to being installed or mounted onto a stud wall.

With reference to FIG. 4, illustrated is a wallboard building material 10, formed in accordance with one exemplary embodiment of the present invention, just prior to being installed on or hung from a stud wall 2. Specifically, a wallboard building material 10 comprises the same components as that of FIGS. 1 and 2. It should be noted that no specialized installation techniques are required for installing or hanging the wallboard building material 10. The wallboard building material 10 may be installed in a similar manner as conventional drywall or other similar products. However, FIGS. 5-A and 5-B illustrate other exemplary embodiments of wallboard building materials that may require one or more special installation techniques. These embodiments are discussed in detail below.

With reference to FIGS. 5-A and 5-B, illustrated are two different examples of coupling and sealing systems, each one being incorporated into a present invention wallboard building material, and each one being configured to couple adjacent wallboard panels together, and to seal or at least partially seal (e.g., not necessarily a strict airtight seal) the adjacent wallboard panels. The coupling and sealing system is intended to reduce and/or eliminate the flanking path between the adjacent wallboard panels at the joint. The seal may be further enhanced or improved upon nailing, screwing, or otherwise securing the joint to a stud in a stud wall. Indeed, the overlap shown is intended to be positioned about a stud, but this may or may not always be possible. The seal functions to resist sound transmission through the joint, and also to resist heat transfer through the joint, by creating a more complex flanking path for heat transfer and sound transmission. In other words, the flanking path is intended to be reduced and/or eliminated if possible by the coupling and sealing system of the present invention.

With specific reference to FIG. 5-A, illustrated are partial end views of a first wallboard building material 210-A and a second wallboard building material 210-B, each one formed in a manner as described herein. The first wallboard building material 210-A comprises a protruding or male configuration 218 formed within and along an edge of the core matrix 214-A, which is intended to align and mate with a corresponding recess or female configuration 222 formed within and along an edge of the core matrix 214-B of the second wallboard building material 210-B. The coupling or connection is designed to secure the first and second wallboard materials 210-A and 210-B, respectively, in a proper position with respect to one another, and to permit the edges of the membranes 234-A and 254-A of the first wallboard building material 210-A to meet the membranes 234-B and 254-B of the second wallboard building material 210-B. The coupling system further helps to maintain proper positioning after installation. The coupling system may be formed about any of the edges of the wallboard building material.

FIG. 5-B illustrates partial end views of a first wallboard building material 310-A and a second wallboard building material 310-B each one formed in a manner as described herein. The first wallboard building material 310-A comprises a notch 326 formed within and along an edge of the core matrix 314-A, with the surface parallel to the surface of the membranes 334-A and 354-A optionally comprising a nub 328, also formed from the core matrix 314-A. The notch 326 is intended to align and mate with a corresponding notch 330 formed in the second wallboard building material 310-B to couple together the first and second wallboard building material. The notch 326 optionally comprises a recess 332 that receives nub 328 therein when the first and second wallboard building materials are secured or coupled to one another. The coupling system shown in FIG. 5-B is intended to perform a similar function as the coupling system shown in FIG. 5-A.

It is noted that the coupling system is integrally formed into the core matrix during manufacture of the wallboard building material. The unique composition of the core matrix provides this capability. The particular size, shape, or configuration of the coupling system may vary, and may be formed in accordance with various different manufacturing techniques.

It also contemplated that one or more sealing members or adhesives may be applied to the coupling system to enhance the sealing function achieved by coupling the two wallboard panels together.

With reference to FIG. 6, illustrated is a detailed perspective view of a wallboard building material formed in accordance with one exemplary embodiment of the present invention.

Utility materials can exist in a variety of forms. Much discussion herein is directed to the specific embodiment of wallboard. However, it should be noted that the principles, compositions, and methods discussed apply to a variety of forms of utility materials, and should be interpreted as such.

As shown in FIG. 6, the building material 710 is in panel form, similar to a wallboard panel, having a size of approximately 4 ft. in width, and 8 ft. in length, which is the same size as most conventional wallboard products. Of course, other sizes such 4 ft. by 8 ft. sizes, as well as different thicknesses is also contemplated. The building material 710 is shown as comprising a core matrix 714 disposed about a single facing sheet or layer, namely facing membrane 734. The other side 718 of the building material 710 is exposed, or rather, the other side of the core matrix 714 is exposed, thus exposing a portion of the configuration of microparticles, binder and setting agent. The exposed surface of the core matrix provides and defines a rough, porous surface that is designed and intended to better attenuate sound. The exposed side of 718 of the core matrix 714 is intended to face inward as the building material is installed or mounted to a structure, such as a stud wall, with the facing membrane 734 facing out.

The density of the building material having the core composition just described is generally between 0.4 g/ml and 0.6 g/ml, although such density can vary greatly depending on the selection and amount of each component, as well as the presence or absence of foaming.

The facing membrane 34, and/or 54 shown in FIG. 2, may comprise many different types of materials or combinations of materials, and comprise different properties. In one exemplary embodiment, facing membranes 34 and/or 54 can each be independently selected. One or both facing membranes can comprises a paper material similar to that found on various wallboard products, such as drywall or the wallboard incorporated by reference herein, as noted above. In another exemplary embodiment, the facing membrane may comprise metal or a metal alloy. The metal may be quilted, corrugated or otherwise comprise one or more nonplanar surface configurations. In a further embodiment, one facing membrane can comprise or consist essentially of aluminum or quilted aluminum. In such cases, the aluminum may have a thickness ranging from about 0.002 in. to about 0.010 in. and more commonly between 0.004 in. and 0.005 in. Optionally, the metallic facing membrane, e.g. an aluminum facing membrane, can be embossed or otherwise include a three-dimensional pattern on the surface, or throughout the entire length of the membrane.

As the final product is desirably a cohesive one, in one aspect, the core material and facing sheet of the wallboard can be optimized for proper or superior adhesion, thus ensuring the facing sheet will remain secured to the core material. As such, additional binder or binders at the surface level can be utilized to improve adhesion of a facing sheet to the core matrix. Alternatively, a different adhesive agent can be utilized to improve adhesion of a facing sheet to the core matrix.

In certain applications, it may be desirable to eliminate the facing sheet altogether. Specifically, to enhance the fire resistant properties of the building material, the facing sheet, particularly if paper, may be eliminated. The core matrix may be configures to be self-supporting, meaning that the building material does not require a facing sheet to maintain its shape and integrity.

FIG. 6 further illustrates the exposed side 718 of the core matrix as comprising a multi-elevational surface configuration. Such a configuration may be utilized to reduce weight. Additionally, this configuration may be designed in such a way that enhances the sound attenuation properties of the building material. The purpose of providing a multi-elevational surface configuration formed about one surface, particularly the exposed surface, of the core matrix is at least threefold—1) to reduce weight, 2) to enhance the sound attenuation or damping properties of the building material, namely to ensure acoustic isolation and absorption over a wide range of frequencies, and 3) to enhance the flex strength of the building material by eliminating shear lines. As will be described below, many different multi-elevational surface configurations are contemplated herein. Those skilled in the art will recognize the benefits of providing a series of peaks and valleys about a surface to create different surfaces located in different elevations, as well as different surfaces oriented on different inclines, particularly for the specific purpose of attenuating sound. Sound waves incident in these different elevational and/or oriented surfaces are more effectively attenuated.

In the specific embodiment shown, the multi-elevational surface configuration comprises a waffle pattern, with a plurality of protruding members 718, having a square or rectangular cross-section, defining a plurality of recesses 726. This series of peaks and valleys effectively creates a plurality of surfaces (in this case horizontal surfaces 730 and 734) that are located in different elevations about the overall surface of the core matrix 714. In addition, the protruding members 718 may be configured to provide surfaces oriented at different angles (in this case, the protruding members 718 also define several vertically oriented surfaces 738).

It is further contemplated that a separate mesh facing sheet may or may not be disposed over the exposed multi-elevational surface of the core matrix 714. If used, the mesh facing sheet is preferably configured to be flexible to conform to the multi-elevational surface configuration. The mesh facing sheet may be made from glass, plastics (e.g., extruded plastics), or other materials, depending upon the particular application and need.

Figure 14:
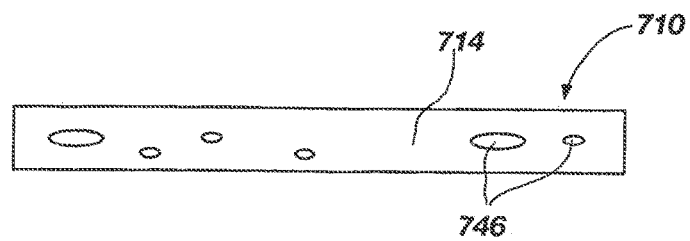
FIG. 14 illustrates a cross-sectional side view of a building material in accordance with another exemplary embodiment, wherein the building material comprises a plurality of strategically formed and located cavities or voids.

FIGS. 6 and 14 further illustrate the building material 710 as comprising a plurality of cavities or air pockets 746 strategically formed and located throughout the core matrix 714, and designed to reduce the overall weight of the building material without significantly affecting the strength or other properties of the building material. Preferably, the cavities 746 are randomly located throughout the core matrix 714, but they may also be arranged in a pre-determined pattern. The cavities 746 may be formed during the manufacture of the building material. Essentially, the cavities 746 function to define a plurality of voids or air pockets within the core matrix 714 at various location. The cavities 746 may be sized to comprise a column between about 0.2 and about 200 $cm^3$, and preferably between about 5 and about 130 $cm^3$. These not only help to reduce weight, but also help to increase the overall R value due to the dead air space. In addition, these help to further attenuate sound as these provide additional surfaces that function to absorb sound waves rather than transmit them.

With reference to FIGS. 7-A and 7-B, shown is a building material formed in accordance with another exemplary embodiment of the present invention. The building material 810 is similar in many respects to the building material 810 discussed above and shown in FIG. 6. However, building material 810 comprises a lath 854 disposed or sandwiched within the core matrix 814. The lath 854 comprises a plurality of intersecting members 856 forming a grid having a plurality of openings 858. The lath 854 functions to provide support and stability to the core matrix 814, as well as additional strength. In addition, the lath 854 increases the mass of the building material 810, which reduces the potential for vibration, thus contributing to the sound attenuation properties of the building material 810. The lath 854 may comprise many different types and configurations, with the grid and openings being of different sizes and configurations. The lath 854 shown in FIG. 7 is not intended to be limiting in any way.

In one aspect, the lath 854 may comprise a metal, fiberglass, or plastic mesh or mesh-like material. This reinforcing lath material provides strength to the building material 810, and further supports the microparticles. The lath 854 may also be made from glass, plastics (e.g., extruded plastics), or other materials, depending upon the particular application and need.

Figure 8:
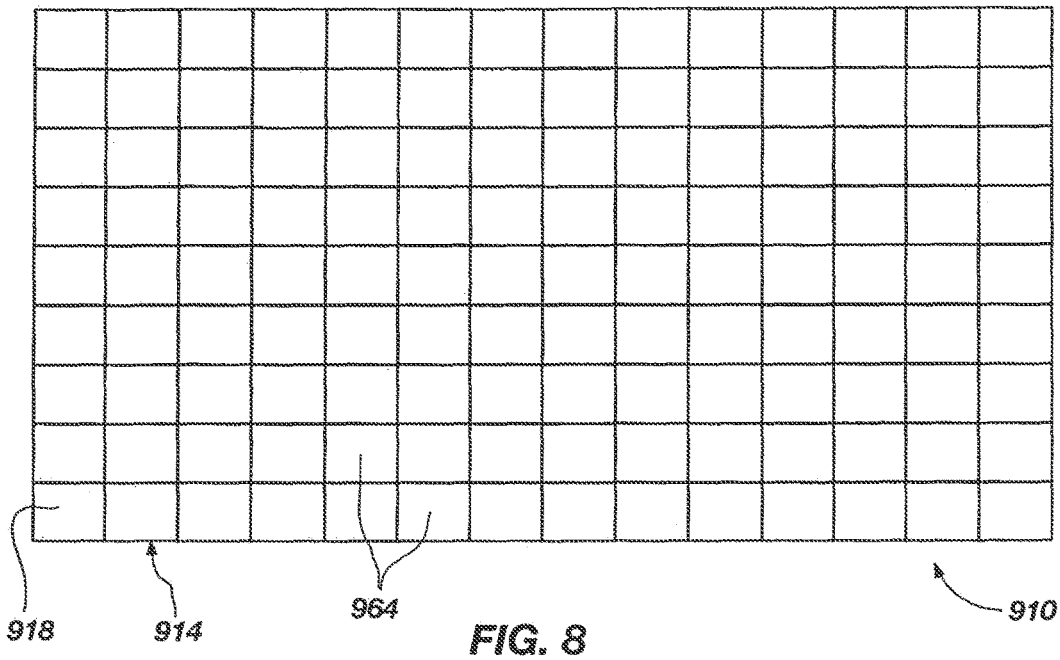
FIG. 8 illustrates a top view of a building material in accordance with still another exemplary embodiment of the present invention, wherein the building material comprises a patterned pillow-like multi-elevational surface configuration formed in the exposed surface of the core matrix.
Figure 9:
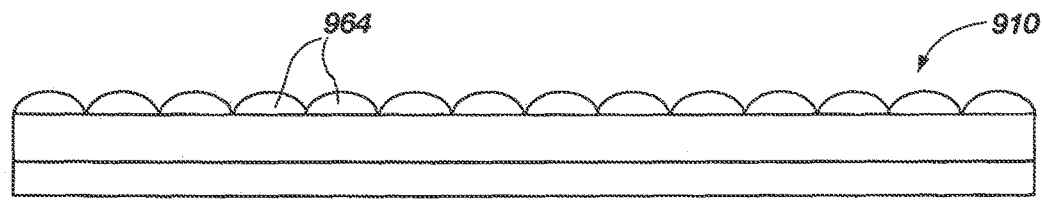
FIG. 9 illustrates a cross-sectional side view of the building material of FIG. 8.
Figure 10:
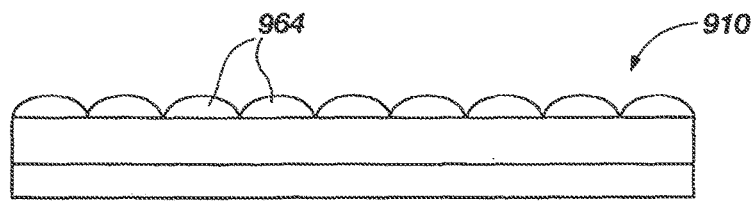
FIG. 10 illustrates a cross-sectional end view of the building material of FIG. 8.

With reference to FIGS. 8-10, illustrated is a building material 910 formed in accordance with another exemplary embodiment of the present invention. In this embodiment, the building material 910 comprises a core matrix 914 having a first surface 918. Formed in the first surface 918 is a multi-elevational or non-planar surface configuration in the form of a repeating pattern of pillow-type protrusions, thus providing multiple different surfaces or surface areas in multiple different elevations. The protrusions may be any desired size, configuration, and height. Therefore, those shown in the drawings are intended to be merely exemplary.

Figure 11:
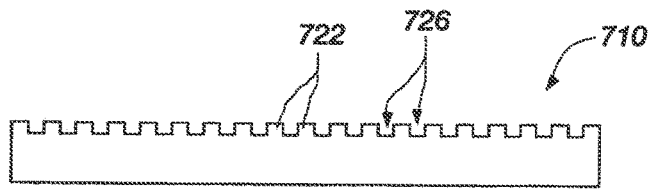
FIG. 11 illustrates a detailed side view of the building material of FIG. 6.

With reference to FIG. 11, illustrated is a side view of the building material 710 of FIG. 6, having a multi-elevational surface configuration in the form of a repeating waffle-type pattern. The waffle-type configuration extends between the perimeter edges of the building material, and defines a plurality of protrusions 722 and recesses 726. FIG. 9 illustrates a cross-sectional view of a building material wherein the building material 710 comprises a plurality of strategically formed and located cavities or voids 746 in the core matrix 714.

Figure 12:
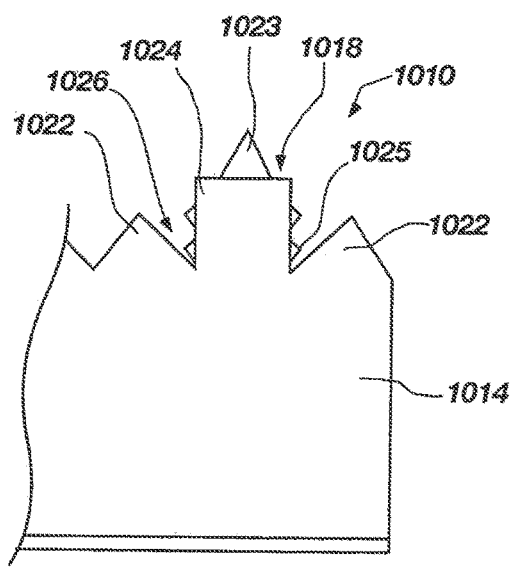
FIG. 12 illustrates a detailed side view of a building material having a multi-elevational surface configuration in accordance with another exemplary embodiment.

FIG. 12 illustrates a detailed side view of another exemplary building material 1010 comprising a core matrix 1014 having a first surface 1018, wherein the first surface 1018 has formed therein a multi-elevational surface configuration comprising a repeating pattern of first protrusions 1022 in the form of pyramids or cones, and a repeating pattern of second protrusions 1024 having an arbitrary shape. The second protrusions 1024 are shown as comprising a primary base protrusion having a square cross-section, upper secondary protrusions 1023, and lateral secondary protrusions 1025, each having a pyramid or cone shape. First and second protrusions, 1022 and 1024 define recesses 1026. While the present invention is not intended to be limited to any particular shape of protrusions. FIG. 12 illustrates that arbitrary shapes are at least contemplated.

Figure 13:
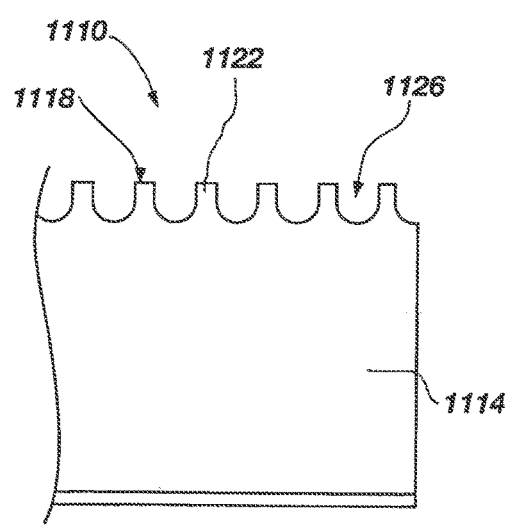
FIG. 13 illustrates a detailed side view of a building material having a multi-elevational surface configuration in accordance with another exemplary embodiment.

FIG. 13 illustrates a detailed side view of another exemplary building material 1110 comprising a core matrix 1114 having a first surface 1118, wherein the first surface 1118 has formed therein a multi-elevational surface configuration comprising a repeating pattern of first protrusions 1122 and recesses 1126, wherein these form an egg carton-type pattern.

FIGS. 8-13 illustrate several different multi-elevational surface configurations. These, however, are not meant to be limiting in any way. Indeed, one skilled in the art will recognize other configurations and/or patters that may be used to accomplish the designs of the present invention.

Figure 15:
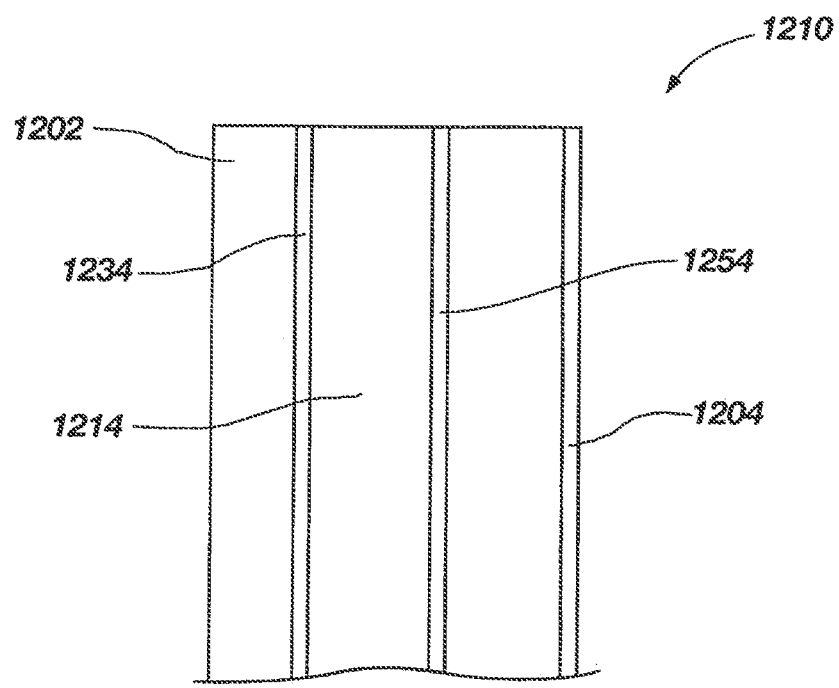
FIG. 15 illustrates a building material configured for use as a finishing material on an exterior of a structure.

Referring now to FIG. 15, illustrated is a building material formed in accordance with another exemplary embodiment. In this particular embodiment, the building material 1210 comprises a core matrix 1214, a metal lath 1254 disposed or sandwiched within the core matrix 1214, and a facing sheet 1234 comprised of tar paper. With this configuration, the building material 1210 may be used as a finishing material on the exterior of residential or commercial structures, replacing stucco. The building material 1210, comprising pre-formed panels, can be mounted or secured to the exterior walls 1202 of a structure, say a residential home, much in the same way a wallboard is mounted or secured to the interior walls of the home. Once secured in place, a stucco finish 1204 commonly known in the art may be applied to the panels to create a finished look. The stucco finish can be applied so as to sufficiently conceal any seams or gaps between adjacent building material panels. Some obvious advantages that result from providing exterior finishing panels is the elimination of the labor intensive task of securing metal lath to the exterior walls, subsequently applying plaster over the metal lath, and then waiting several days for the plaster to dry and set prior to being able to apply the stucco finish. With the pre-formed building panels is shown herein, installers can mount the panels and apply the stucco finish immediately, thus significantly reducing labor and costs.

It is contemplated that such a building material may be applied to shear panels, such as oriented strand board, to shear panels formed after the manner of the present invention, or directly to a stud frame, wherein the building panel may function as the shear panel and also receive the stucco finish directly thereto, thus eliminating the need for a separate shear panel.

When the metal facing sheet is used, the heating elements can be configured to concentrate a majority of the heat through the metal facing sheet to the core matrix. In this manner, the heat is better received into the core matrix, steam is removed from the core matrix primarily through the second facing sheet, typically paper, and large steam pockets are not formed.

Utility materials as described herein exhibit superior qualities to many utility materials currently available. Furthermore, the superior qualities co-exist, where a material may exhibit both mold resistance and enhanced acoustic properties simultaneously. Wallboards formed of the utility materials are typically lighter than convention gypsum wallboard by 20% to 30%. An installed R value can be up to about 19. Noise attenuation can be up to about 50 db, depending on the frequency for a ½ inch thick piece of wallboard. The core matrix will not grow mold. Wallboard is water resistant and is still hard after 2 weeks of continuous submersion under water. The material can be formulated to be fire resistant. Wallboard exhibits strong flexural strength up to two times that of conventional gypsum wallboard (e.g., 280 lbs vs. 140 lbs). Furthermore, the wallboard can withstand impacts without crumbling or displacement in surrounding areas such as a corner. Various industry considerations for wallboard performance include, but are not limited to, surface finish, snap and dust, flexural strength, nail pull resistance, dimpling, edge crush, weight, mold growth, water resistance, fire resistance, and R value.

EXAMPLES

The following examples illustrate embodiments of the invention that are presently known. Thus, these examples should not be considered as limitations of the present invention, but are merely in place to teach how to make the best-known compositions and forms of the present invention based upon current experimental data. Additionally, some experimental test data is included herein to offer guidance in optimizing compositions and forms of the utility material.

As such, a representative number of compositions and their method of manufacture are disclosed herein.

Example 1

Sample Wallboard Utility Material

In one specific example (producing a sample core matrix having dimensions of 8"×9"×½"), the core matrix composition is as follows: the microparticles is 56 wt % of wet core matrix, the sodium silicate binder is 40 wt % of wet core matrix, and the isocyanate setting agent is 4 wt % of wet core matrix. In this example, the core matrix is formulated to comprise a two-part mixture. The first part comprising 150 grams microparticles initially mixed with 140 grams sodium silicate Type O from PQ Corporation. The second part comprising 50 grams microparticles (e.g., cenospheres) initially mixed with 14 grams "A" side from Reactamine JS 2:1 of Reactamine Technology, LLC, which is an isocyanate prepolymer. These two mixtures, once each individually blended, were then blended together and deposited onto one side of a sodium silicate-coated wallboard face paper. A waffle pattern was then pressed into the upper surface of the core matrix composition. A second sodium silicate-coated paper facing sheet was then deposited over the core matrix composition, which second paper facing sheet was held in place under pressure for between 5-10 minutes, which allowed the core matrix composition to initially set and harden under ambient temperature conditions. The sample was then placed onto a drying rack and allowed to cure under ambient temperature conditions for a 24 hour period.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across carious embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which exampled are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material, or acts that support the means-plus-function are expressly recited in the description herein. Accordingly, the scope of the invention should be determined solely by the appended claims and their legal equivalents, rather than by the descriptions and examples given above.

The invention claimed is:

1. A utility material comprising:
a wallboard having a first facing membrane and a second facing membrane; and
a core matrix disposed between the first facing membrane and the second facing membrane, wherein the core matrix includes:
a plurality of microparticles having an outer shell and a hollow interior, and at least one binder;
wherein the at least one binder is excluded from the hollow interior;
wherein the hollow interior is filled with a gas; and
wherein the plurality of microparticles are from about 10 microns to about 1500 microns in size.

2. The utility material of claim 1, wherein the plurality of microparticles are from about 10 microns to about 500 microns in size.

3. The utility material of claim 1, wherein the core matrix, as a wet formulation, includes from about 25 wt % to about 75 wt % of the plurality of microparticles.

4. The utility material of claim 1, wherein a reinforcing member is disposed within the core matrix.

5. The utility material of claim 1, wherein the core matrix comprises a protruding configuration formed within and along an edge of the core matrix.

6. The utility material of claim 1, wherein the core matrix comprises a recess formed within and along an edge of the core matrix.

7. The utility material of claim 1, wherein the core matrix comprises a notch and a nub formed within and along an edge of the core matrix.

8. The utility material of claim 3, wherein the core matrix, as a wet formulation, includes from about 50 wt % to about 60 wt % of microparticles.

9. The utility material of claim 1, wherein at least one binder is an inorganic binder.

10. The utility material of claim 9, wherein the inorganic binder is a sodium silicate binder.

11. The utility material of claim 10, wherein the core matrix, as a wet formulation, includes from about 20 wt % to about 60 wt % of the sodium silicate binder.

12. The utility material of claim 10, wherein the core matrix further includes a setting agent.

13. The utility material of claim 11, wherein the core matrix, as a wet formulation, includes from about 35 wt % to about 45 wt % of the sodium silicate binder.

14. The utility material of claim 12, wherein the core matrix, as a wet formulation, includes from about 2 wt % to about 10 wt % of the isocyanate setting agent.

15. The utility material of claim 12, wherein the core matrix, as a wet formulation, includes from about 3 wt % to about 6 wt % of the setting agent.

16. The utility material of claim 12, wherein the setting agent is an isocyanate setting agent.

17. The utility material of claim 16, wherein the sodium silicate binder and the isocyanate setting agent are at a ratio of from about 1:1 to about 15:1.

18. The utility material of claim 16, wherein the sodium silicate binder and the isocyanate setting agent are at a ratio of from about 8:1 to about 12:1.

\* \* \* \* \*